July 13, 1926.
V. P. GAMBOA
STATION INDICATOR
Filed Sept. 18, 1924
1,592,484
5 Sheets-Sheet 1
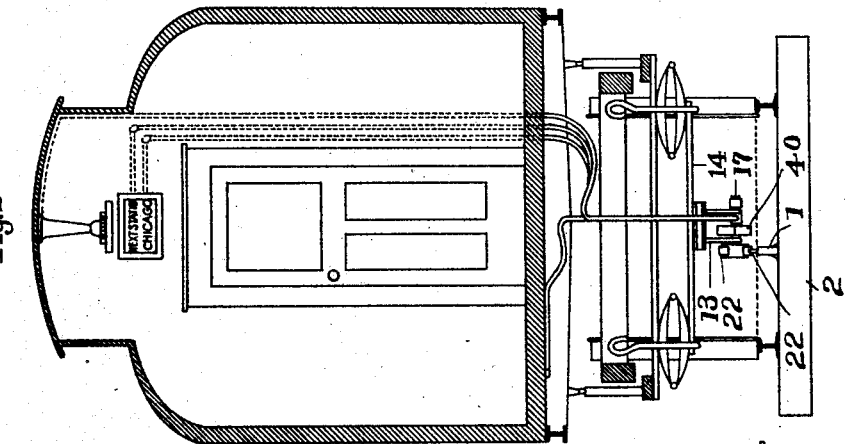
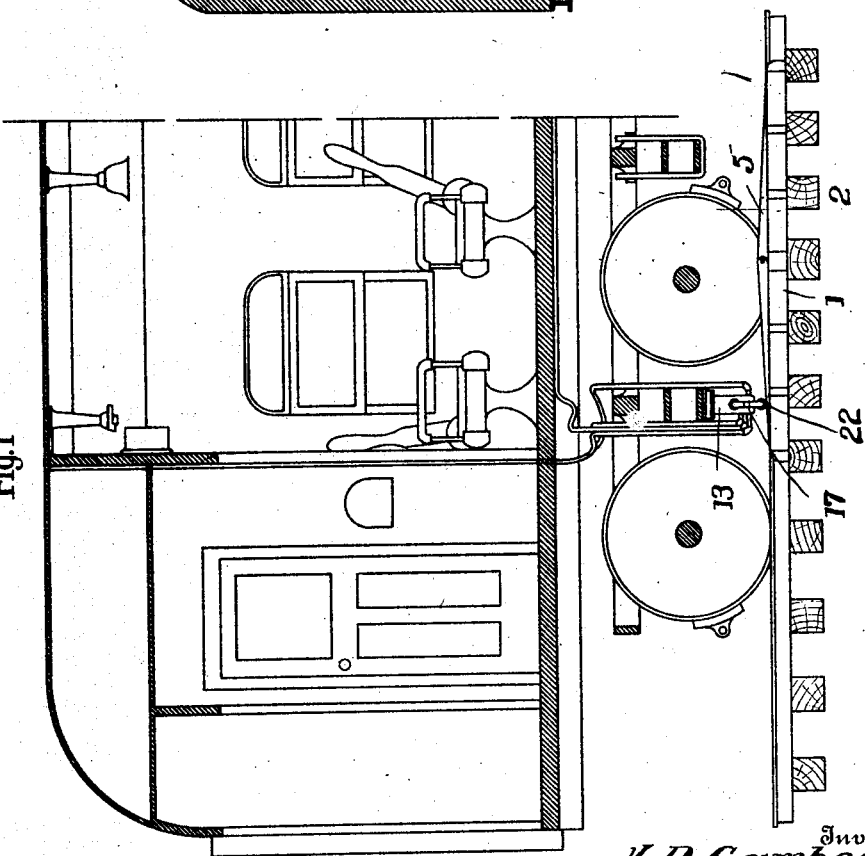
Inventor
V. P. Gamboa
Attorney July 13, 1926.
V. P. GAMBOA
STATION INDICATOR
Filed Sept. 18, 1924
1,592,484
5 Sheets-Sheet 2
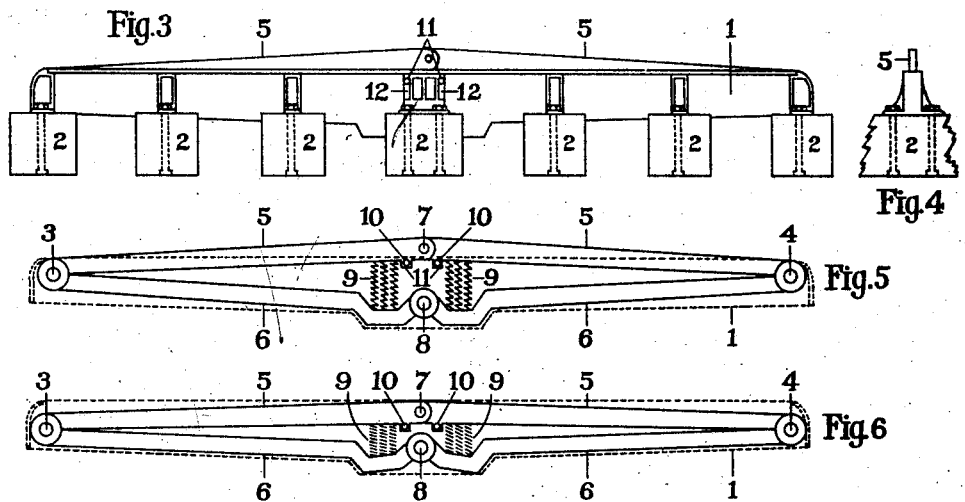
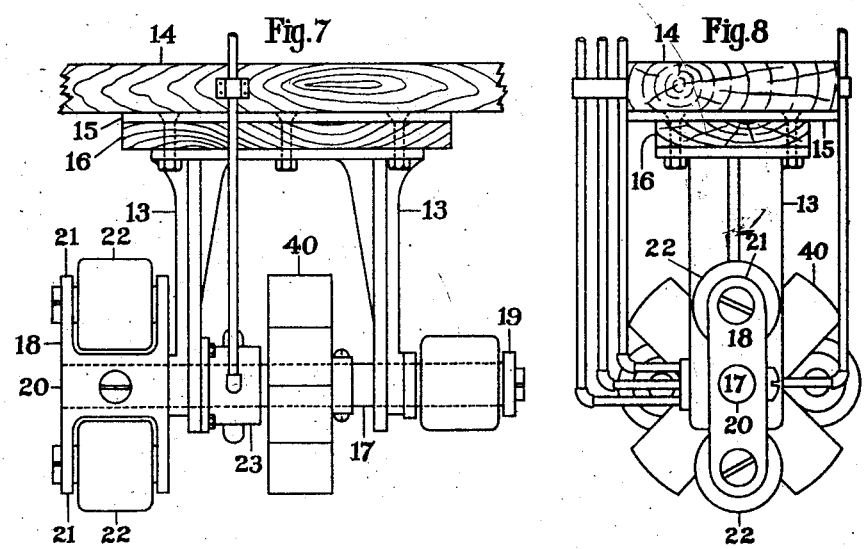
V. P. Gamboa, Inventor
Attorney

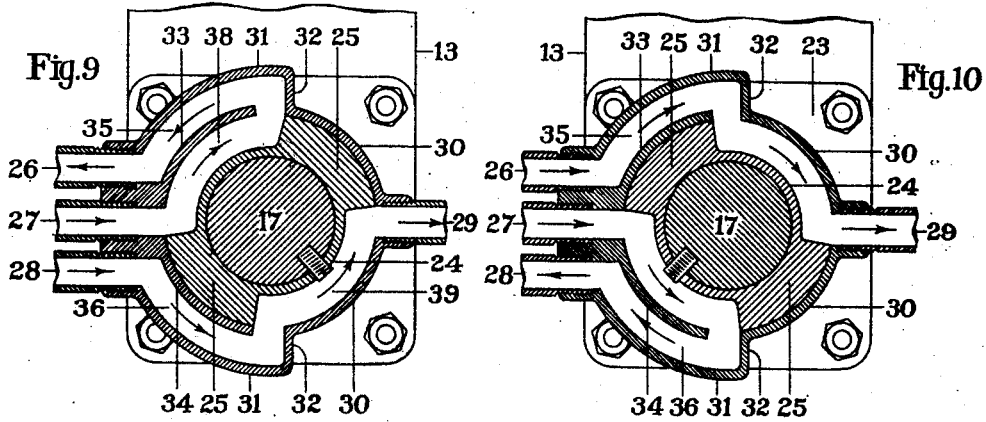
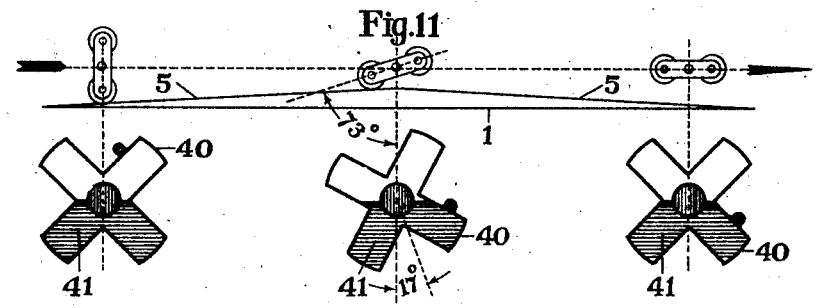
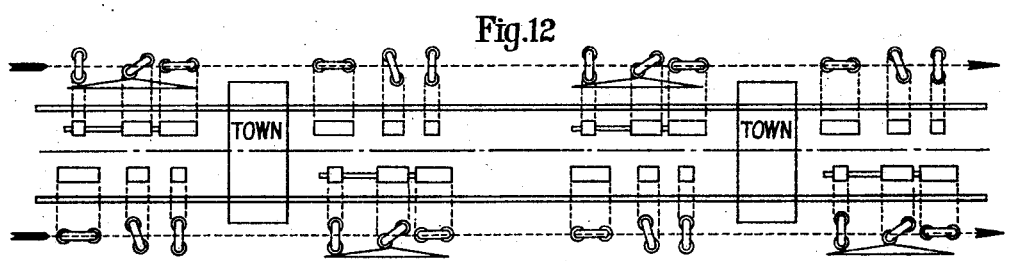

July 13, 1926.

V. P. GAMBOA

STATION INDICATOR

Filed Sept. 18, 1924

Inventor
V. P. Gamboa
By
Attorney

July 13, 1926.
V. P. GAMBOA
STATION INDICATOR
Filed Sept. 18, 1924    5 Sheets-Sheet 5
1,592,484
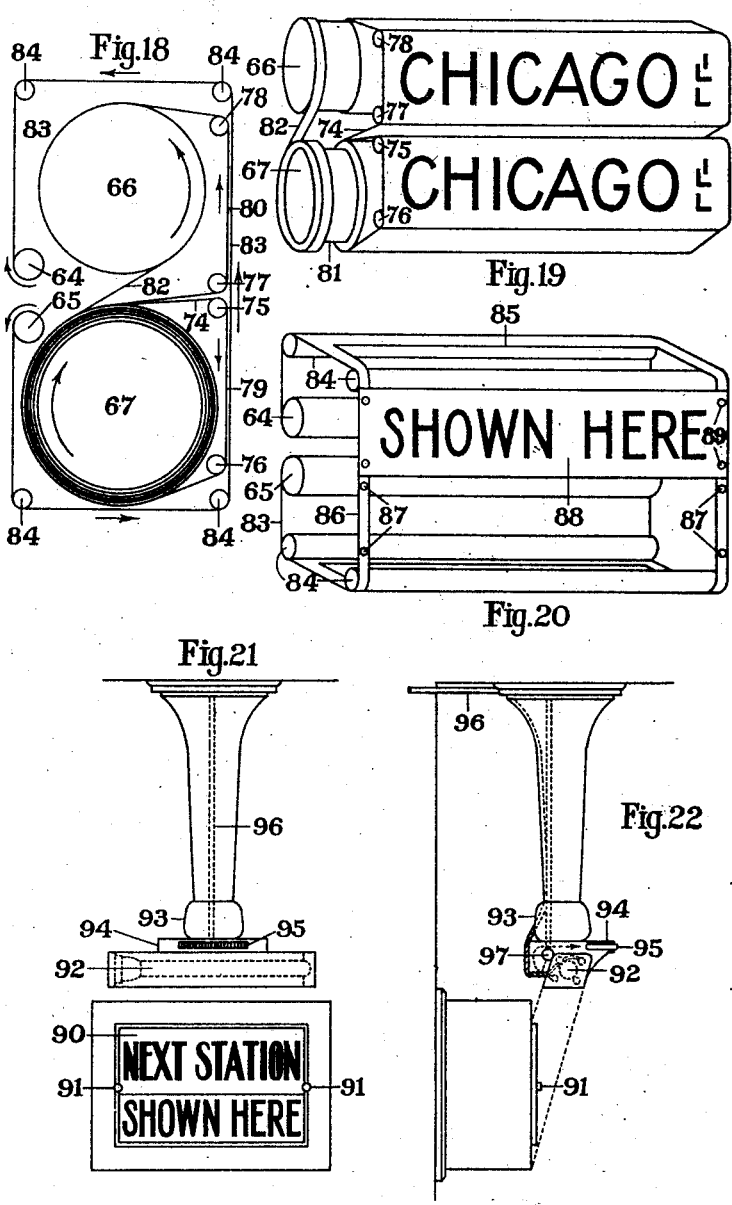

Patented July 13, 1926.

1,592,484

UNITED STATES PATENT OFFICE.

VICENTE PERALES GAMBOA, OF CHICAGO, ILLINOIS.

STATION INDICATOR.

Application filed September 18, 1924. Serial No. 738,477.

This invention is directed to a station indicator, designed to be automatically actuated in the travel of a train and to visibly indicate the station being approached and at the same time sound an audible signal to direct attention to the station indication.

The station indicator proper and audible signal are designed to be operated by air pressure drawn from any suitable source, as for example from the air reservoir of the braking system, with the control of the air pressure governed by train carried elements, adapted to be operated by appropriately arranged and disposed track sections.

The invention includes an air distributor carried by the train for controlling the air pressure to the station indicator and signals, a trip element being arranged to actuate the air distributor, and being in turn controlled by the track member. Cooperating with these parts there is provided a regulator which insures of an accurate position of the element, and therefore a proper position of the air distributor, following each track section engagement, to render certain the action of the structure.

The invention is illustrated in the accompanying drawings in which:—

Figure 1 is a view in elevation part in section of a passenger coach showing the application of the invention thereto.

Figure 2 is a transverse section of the same.

Figure 3 is a view in elevation of the track element, with which the trip cooperates.

Figure 4 is an end view of the same.

Figure 5 is a view in elevation of the movable members of the track element, casing or box therefore being shown in dotted outline.

Figure 6 is a similar view showing the movable members depressed as when engaged by the train carried trip.

Figure 7 is a view in front elevation showing the train carried operating parts including the trip levers, regulator, and air distributor.

Figure 8 is an end view of the same.

Figures 9 and 10 are sectional views of the air distributor, the respectively opposite positions thereof being shown.

Figure 11 is a diagrammatic view illustrating the respective positions of one of the trip levers as moved from normal to operative position during and following cooperation with the track member, this figure also showing the relatively corresponding positions of the regulator.

Figure 12 is a diagrammatic view illustrating the operation of the tripping mechanism and the travel of a train past at least two stations, the names of which appear on the indicator.

Figure 17 is a perspective view of the tape carrying the names of the stations.

Figure 18 is a diagrammatic view illustrating the application of the sign bearing tape, the use of an operating metal tape strip and a curtain tape.

Figure 19 is a perspective view showing the arrangement of the sign bearing tape and of the metal tape strip.

Figure 20 is a similar view showing the use of an additional or curtain tape.

Figure 21 is a view in front elevation showing the indicator proper and the corelated signalling means.

Figure 22 is a side elevation of the same.

Figure 13:
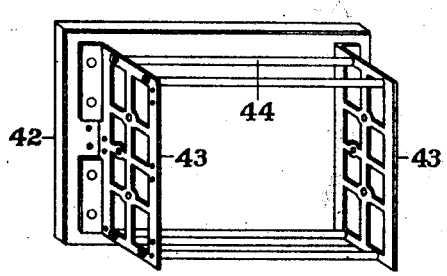
Figure 13 is a perspective view of the indicator casing.

The present invention is made up of several primary parts, as for example the operating sections adapted to be arranged at appropriate points between the rails of the track; the control means, which is carried on the coach or coaches of the train and which is operated through contact with the operating track sections; an indicator, which is arranged in the coach conveniently visible to the passengers, and which is actuated by the control means. The following specification will specifically describe each of these separate units in the order named.

*Track operating sections.*—The track operating sections, which are identical throughout the system, includes the casing 1 of appropriate length supported between the track rails on the usual sleepers 2. Pivotally supported at the respective ends 3 and 4 of the casing 1 are upper and lower arms 5 and 6, which arms extend toward the center of the casing and are pivotally interconnected at 7 and 8. Springs 9 are arranged between the arms adjacent their pivotal connections 7 and 8, and bolts 10 are connected to the lower sides of the upper arms 5, both ends of the bolts sliding in grooves 12 formed in a fixture secured in the casing 1, with the effect to limit the upward movement of the pivotally connected ends of the arms 5 under the pressure of the springs 9. The arrangement of the parts is such that in normal position the arms 5 at their pivotal point 7 extend above the upper surface of the casing 1, the upward limit of movement of the end pivots 3 and 4 being determined by the casing. The arms 5 yield under contact with trip levers on the train carried control means, tending however by reason of the normal inclination of these arms to rock the trip levers, as will later appear. The upper wall of the casing 1 is formed with a slotted opening of a size to just permit the passage therethrough of the arms 5, the lower portion of the casing being formed if desired with openings to balance the air pressure within the air casing. The pivotal arms in the casing tend to preclude entrance of foreign matter which might interfere with operation of the arms.

*Control means.*—The control means shown more particularly in Figures 7 to 11, inclusive, includes a frame 13 adapted to be arranged on each coach in which an indicator is to be positioned. The frame is preferably secured to usual sill board 14, which supports the flat springs in the wheel trucks, a metal plate 15 underlying the sill board, and a spacing block 16 being arranged between the metal plate and frame, to insure an accurate spacing of the operating parts of the control means relative to the track operating device. The frame 13 includes spaced hangers in the lower end of which is rotatably mounted a shaft 17, on the respective ends of which, immediately beyond the hangers are fixed the trip levers indicated at 18 and 19. These levers are identical and comprise sleeve portions 20 secured upon the shaft and diametrically opposed extensions 21 between which, in both directions beyond the sleeves are arranged rollers 22. The respective trip levers are arranged at relatively right angles, so that when one is vertical in respect to the frame the other is horizontal thereto, as clearly indicated in Fig. 7. Fixed to one of the hangers is the casing 23 of an air distributor within which, and secured upon the shaft 17 is arranged a cutoff 24. The cutoff is formed with diametrically opposed wings 25; and the casing 23 in which the cutoff operates is formed at one side with three vertically aligned ports 26, 27 and 28 and at the opposite side with a central single port 29. The exterior wall of the casing 23 throughout approximately about half next to port 29 is concentric with the cutoff with its wall or shell 30 having a diameter corresponding to the maximum diameter of the cutoff. The remaining half of the casing, or that portion next to the three vertically aligned ports, has an exterior diameter exceeding that of the maximum diameter of the cutoff, that is the outer wall or shell 31 of this portion of the casing, while concentric with the cutoff is larger than the same. The adjacent ends of walls 30 and 31 are connected by wall sections 32, and within the larger portion of the casing there are provided partitions 33 and 34 in the upper and lower portions of the casing arranged concentric with the cutoff and formed on a radius corresponding to that of the cutoff. These partitions do not extend to the joining walls 32 of the casing, so that there is formed within the casing an upper channel 35 in open communication with port 26, a lower channel 36 in open communication with port 28, and a space inwardly of the partitions 33 in communication with the port 27.

The wings 25 of the cutoff are coextensive circumferentially with the lengths of the partitions 34 and of the wall sections 30, the remaining circumference of the cutoff being materially reduced in diameter. Therefore with the cutoff in the position indicated for example in Figure 9 there is a space provided between the cutoff and the upper partition 33, as at 38 and a space as 39 provided between the reduced wall of the cutoff and the lower wall section 30 of the casing. Ports 26 and 27 are thus in communication while port 28 is in communication around the cutoff with port 29. In the reverse position of the cutoff, as indicated in Figure 10, ports 27 and 28 are in communication around the lower partition 34, while port 26 is placed in communication with port 29 around the cutoff through the channels in the upper portion of the casing. Thus, in accordance with the respective positions of the cutoff the port 27, which is always an inlet port placed in communication with either the ports 26 or 28, and one or the other ports 26 or 28 is placed in communication with the port 29, which is always an outlet port.

Secured upon the shaft 17, immediately adjacent the air distributor, is what is termed the regulator. This regulator comprises a hollow cruciform body 40 adapted to contain an appropriate mass of mercury, indicated at 41. The arms or sections of this body are fixed from shaft so as to radiate at an angle of 45° to the respective trip levers, so that when a lever is vertical the mercury will be carried in two divergent depending arms of the body, to insure an exact position of the trip arm, and therefore of the cutoff in the air distributor. This regulator is particularly important as when the trip arm engages the track operating section it is swung to a position somewhat less than the required 90°, and in this movement of course causes the mercury to follow into the arms of the body of the regulator which are being turned toward the lowermost position. As the parts are moving, the flow of the mercury tends to maintain the inertia and, in fact possibly carry the parts slightly beyond the 90°. As the mercury however will quickly center in the lowermost arms, it is apparent that this regulator will, in effect tend to carry the parts to and maintain them at a full 90° new position.

The regulator is further important in that it permits the use of a less degree of inclination of the arms of the track operating section than necessary to insure a complete movement of the trip lever, as the shifting weight of the regulator will continue the movement of the trip means, and finally bring it to rest in the exactly proper position to set the air distributor.

Figure 14:
Figure 14 is a perspective view of the indicator complete.
Figure 15:
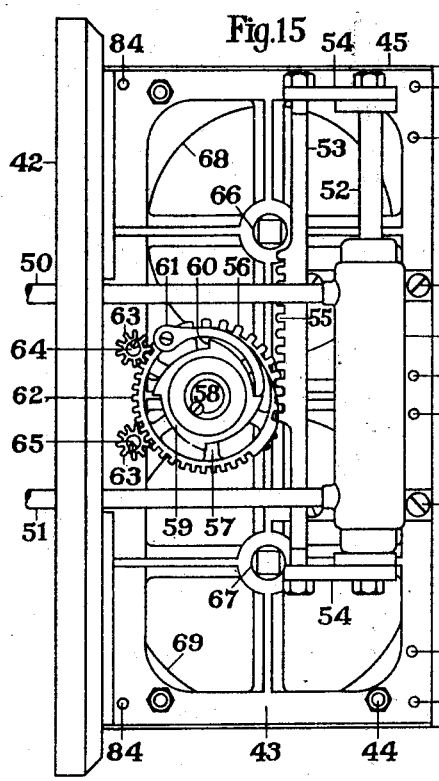
Figure 15 is an end view of the mechanism of the indicator proper, the operative parts being in elevation.
Figure 16:
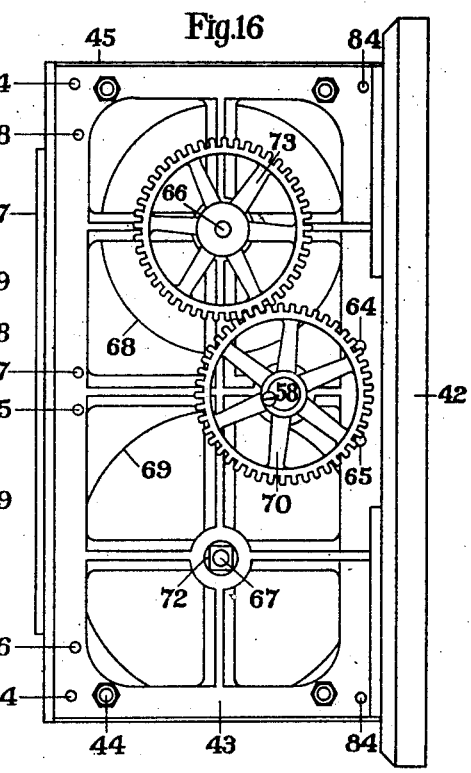
Figure 16 is a similar view taken from the opposite side.

*The indicator.*—The indicator construction is shown more particularly in Figures 13 to 20 inclusive, and comprises a casing including a base 42 arranged for convenient mounting in position, and having skeleton side walls 43, held in rigid position by cross bars 44. The casing form is completed by upper and lower walls 45 secured to the skeleton frame, side walls 46, which are arranged as hingedly mounted door, to permit access to the interior of the structure, and a front wall 47, which will be more particularly hereinafter described.

For operating a cylinder 48 is arranged within the casing through securing means 49 this cylinder having pressure pipes 50 and 51 entering near the respective ends thereof and on opposite sides of a piston within the cylinder, the rod 52 of which projects in opposite directions beyond the cylinder, whereby under air pressure admitted through one or the other of the pipes 50 and 51, the piston rod will be moved toward the appropriate wall of the casing. A rack bar 53 is connected by links 54 with the respective ends of the piston rod, and the teeth 55 of this rack bar are adapted to cooperate with teeth 56 of a mutilated gear 57, loosely arranged upon a transverse shaft 58 of the indicator casing. A ratchet 59 is keyed or otherwise secured upon the shaft 58, immediately adjacent the mutilated gear, this ratchet being formed with four teeth 60 adapted to cooperate with pawl 61 carried by the mutilated gear, so that in the movement of the rack in one direction the shaft 58 is advanced substantially a quarter of a revolution, the movement of the rack in the opposite direction serving to position the pawl for the next movement of the ratchet, without however operating the same. The gear 57 is in part formed with teeth 62 adapted to at all times engage pinions 63 arranged in the ends of what will be termed curtain rolls 64 and 65.

Mounted in the casing are upper and lower drum shafts 66 and 67 on each of which is secured a drum for the main indicating tape, the upper drum 68 being in vertical alignment with and spaced from the lower drum 69. The shaft 58 at the end opposite the mutilated gear is provided with a fixed gear 70. Both ends of both shafts 66 and 67 are squared or of angular formation as indicated at 72, the ends of one side being thus adapted to either receive a gear 73 arranged to mesh with the gear 70, when the side door 46 of the casing overlying such gear 70 is opened; and the ends of the opposite side of both shafts being adapted to either receive a removable crank or operating handle, to thereby permit the initial or correctional setting of the indicating tape and other parts, when the corresponding side door 46 is opened, as may be required by the particular travel of the train. Thus either drum 68 or 69 may be positively driven in the operating of the shaft 58 by the rack bar.

The main indicating tape is shown at 74 in Figure 17, and this tape which is preferably of a non-extensible cloth, paper or the like, is marked on both sides, by printing or otherwise, with the names of the stations for which the particular indicator is designed. One end of this tape is secured to the drum 67, rolled about the same, passed over a guide roller 75 immediately in rear of the face of the casing in substantial alignment with the upper plane of the roll, then downwardly, in parallelism with the face of the casing over a lower guide roll 76, then over the roll 67, passing around the same from beneath, then around the lower guide roll 77 of an upper set of guide rolls, then upwardly in parallelism with the face of the casing, over the upper guide roll 78 of the set, and terminally secured to the drum 66. This arrangement presents two flat display sections 79 and 80 of the tape, these two display sections, by reason of the particular winding of the tape presenting opposite faces of the tape. The names of the stations are increasingly distanced each from the other on the indicating tape, counting from the enrolling drum, in order to balance or counteract the increasing circumference of the same drum. Also the particular arrangement of these names on the tape, in conjunction with the particular winding arrangement of the same, will cause the names of the same terminal station, or starting point of the train, to be displayed in both flat sections when the tape is fully wound on one drum, as shown in Fig. 19.

The ends of the drums, beyond the indicating tape form projections 81 to receive a narrow operating band 82 preferably of steel, wound about the respective drums to insure positive movement of one being properly communicated to the other, to compel winding of the indicator casing. This relieves the indicating tape of the strain of such drum operation, it being apparent however that the respective tapes or bands 74 and 82 must be the same thickness.

A curtain tape 83 is secured to one of the curtain rolls 64 passed over guide rolls 84 and terminally secured to the other curtain roll 65, the curtain tape being wound about one of the rolls sufficiently to permit desired movement. The guide rolls 84 cause the curtain tape to follow the outline of the casing, this curtain tape passing downwardly at the face portion of the casing, in front of the display sections 79 and 80 of the indicating tape. The curtain tape throughout that portion overlying the display sections of the indicating tape is cut out to form an opening 85 therein, of a size to permit visibility of the display sections of the indicating tape in all positions of the curtain tape so far as the opening is concerned. The margins 86 of the curtain tape formed by the opening are provided with upper and lower sets of connecting elements 87 whereby by a sign strip 88, carrying cooperating connecting elements 89 may be removably secured to the curtain tape. It will be apparent that each time the mutilated gear 57 is operated by the rack, the curtain tape will be correspondingly operated, and as the gear is reciprocated by the rack, the curtain tape will be moved back and forth relative to the display sections of the indicating tape. This will cause the sign strip, bearing for example the sign Shown here to be alternately positioned over the respective display sections of the indicating tape, for purpose which will later appear.

A metalic sign section, suitably inscribed, as for example the words Next station, is shown at 90 suitably mounted in guides formed in the casing and arranged on the front of the glass face which overlies the display sections of the indicating tape. The sign section 90 is substantially commensurate with the side of the display section of the indicating tape, and may be manually moved to cover either such display section and held in such position by set screws 91.

The face of the indicator is illuminated from the light source 92 arranged at the lower end of the bracket 93, and provided with deflectors to direct the light directly onto the face of the indicator casing. The bracket 93 is formed with a box-like section 94 adapted to hold an audible alarm, here shown as an ordinary mouth organ 95. The pressure pipe 96 leads through the bracket and terminates in rear of the mouth organ in a transverse pipe 97, perforated to direct streams of air into the mouth organ for sounding the same.

*Operation.*—It is of course to be understood that as indicated in Figure 12 the track operating sections are to be arranged between the rails of the railroad track, in both directions beyond and at appropriate distances from the station of the indicator. These track operating sections are disposed relatively opposite, so that the one engaged as the train is approaching the station will operate for example the trip lever 18 while the one beyond the station will operate the trip lever 19. It is also to be understood that the port 27 of the air distributor is in open communication with a source of air pressure on the train, as for example the air reservoir of the brake system; while the ports 26 and 28 are in communication with the cylinder 48 of the indicator through the pipes 50 and 51; and the outlet port 29 is in communication through the pipe 96 with the audible alarm. It will also be assumed that the curtain sign strip 88 will be arranged to cover one of the display sections of the indicating tape while the metal sign section 90 will be arranged to cover the other of such display sections. The indicator casing face then presents the signs Next station, shown here. As the train reaches the track operating section in advance of the particular station, the trip lever 18 is moved from its vertical position towards its horizontal position, the regulator completing the movement until the trip lever 18 is finally held in horizontal position, but the trip lever 19 is correspondingly held in vertical position. In this movement of the trip levers the cut off of the air distributor is operated and the latter moved to the position, for example as that shown in Figure 9. Air pressure is thus admitted to the cylinder 48 of the indicator and the rack bar moved downwardly moving the mutilated gear and also the shaft 58 through the pawl and ratchet mechanism. This moves the indicating tape to display the name of a station on that display section underlying the curtain sign strip 88, and as the mutilated gear is in cooperation with the curtain tape rolls 64 and 65 the curtain tape is moved so that the sign strip 88 thereof is moved away from the particular display section, rendering visible the name of the station. As the metallic sign strip remains in place the face of the indicator now reads for example Next station, McCook. As the train leaves the station the remaining trip lever, 19, engages the other track operating section, the regulator again completing the movement, moving the initially operated lever to the vertical position, and the trip lever 19 to the horizontal position. The cut off is shifted to the position indicated in Figure 10, whereupon air is admitted in the reverse direction to the cylinder 48 of the indicator, and the rack bar is moved upwardly. This operates the mutilated gear, but not the shaft 58, moving the mutilated gear merely setting the pawl 61 for the succeeding operation with the teeth of the ratchet 59. This operation of the mutilated gear however actuates the curtain tape 83 in the reverse direction, again moving the sign strip 88 carried thereby toward and disposing the same over the station indication of the indicating tape. Thus as the train leaves the station the face of the indicator again reads Next station, shown here. This operation is repeated for the succeeding stations throughout the limit of travel for which the indicator is arranged.

When the train is arriving at a terminal city, and the indicator is to be positioned for the return trip, if the passenger coaches bearing the indicator are not turned but merely travel in the reverse direction, the brakeman will shift the gear 73 to the shaft of the other drum after having manually operated the drum by suitable crank to move the indicator tape to show at the proper display section the name of the next station in the line of travel. When the travel of the train is reversed at the terminus, the brakeman having set the indicator by moving the gear 73 to the other drum, shifted the sign strip 88 to the remaining connectors as 87, and also shifted the sign section 90 to the opposite indicator display section, the indicator tape will properly display the names of the stations at the exposed display section during the return trip. Of course under these conditions the curtain tape sign strip cooperates with the display section opposed to that to which it cooperated on the first run of the train, as will be obvious.

In each positive operation of the piston within the cylinder 48, the air admitted therefrom in a previous operation is forced through the connecting pipe and distributor, the cut off being arranged so that in either position this out going air under pressure is directed through port 29, and thence through the pipe 96 to sound the mouth organ, calling attention to the operation of the indicator. It will be of course apparent that but little pressure was necessary to operate the parts of the indicator, and that the quantity of air required is very small, hence the pipes of the system need have but small bores, though it is necessary that these pipes be formed in part of flexible sections in order to accommodate the relative movements of the trucks and vehicle bodies during travel.

What I claim is:

1. A station indicator having a marked indicating tape, means controlled by track instrumentalities to impart a step by step movement to the tape when approaching a station, and means operated by track instrumentalities to cover the exposed portion of the tape when leaving a station.

2. A station indicator having a marked indicating tape, fluid pressure means controlled by track sections to impart a step by step movement to the tape when approaching a station, and means operated by track sections to cover the exposed portion of the tape when leaving a station.

3. A station indicator having a marked indicating tape, means controlled by track sections to impart a step by step movement to the tape when approaching a station, and a curtain tape operated by said means to cover the exposed portion of the indicating tape when leaving a station.

4. A station indicator having a marked indicating tape, an air distributor for controlling air pressure to impart a step by step movement to such tape in approaching a station to display a portion of said tape, a curtain tape controlled by the air distributor to alternately cover and expose the display portion of the indicating tape, and track operating sections to actuate the air distributor.

5. A station indicator operating means including a cylinder, a piston therein, a piston rod extending in both directions beyond the cylinder, operating elements actuated in the movements of said rod, an air distributor for admitting air on opposite sides of the piston, trip levers for actuating the air distributor, and independent track sections for operating the trip levers.

6. A station indicator operating means including a cylinder, a piston therein, a piston rod extending in both directions beyond the cylinder, operating elements actuated in the movements of said rod, an air distributor for admitting air on opposite sides of the piston, trip levers for actuating the air distributor, and independent track sections for operating the trip levers, and an audible alarm controlled by the air distributor.

7. An operating means for station indicators, including a cylinder, a piston therein, air pressure admission to the cylinder on opposite sides of the piston, the piston rod extending in both directions beyond the cylinder, an indicating tape, a curtain tape, and means for operating the indicating tape through a step by step movement in the operation of the piston rod in one direction, said means operating the curtain tape in relatively reverse direction during movement of the piston rod in both directions.

8. An operating means for station indicators, including a cylinder, a piston therein, air pressure admission to the cylinder on opposite sides of the piston, the piston rod extending in both directions beyond the cylinder, an indicating tape, a curtain tape, and means for operating the indicating tape in certain movements of the piston rod and for operating the curtain tape in all movements of the piston rod.

9. An operating means for station indicators, including a cylinder, a piston therein, air pressure admission to the cylinder on opposite sides of the piston, the piston rod extending in both directions beyond the cylinder, an indicating tape, a curtain tape, and means for operating the indicating tape in certain movements of the piston rod and for operating the curtain tape in all movements of the piston rod, and an air distributor for controlling the air under pressure to the cylinder.

10. An operating means for station indicators, including a cylinder, a piston therein, air pressure admission to the cylinder on opposite sides of the piston, the piston rod extending in both directions beyond the cylinder, an indicating tape, a curtain tape, and means for operating the indicating tape in certain movements of the piston rod and for operating the curtain tape in all movements of the piston rod, an air distributor receiving air under pressure and delivering it to the respective ends of the cylinder in succession, and track sections for controlling the position of the air distributor.

11. An operating means for station indicators, including a cylinder, a piston therein, air pressure admission to the cylinder on opposite sides of the piston, the piston rod extending in both directions beyond the cylinder, an indicating tape, a curtain tape, and means for operating the indicating tape in certain movement of the piston rod and for operating the curtain tape in all movements of the piston rod, and track operating sections for controlling the admission of air to the respective ends of the cylinder.

12. An operating means for station indicators, including a cylinder, a piston therein, air pressure admission to the cylinder on opposite sides of the piston, the piston rod extending in both directions beyond the cylinder, an indicating tape, a curtain tape, and means for operating the indicating tape in certain movements of the piston rod and for operating the curtain tape in all movements of the piston rod, an audible alarm, and an air distributor controlling the admission of air to the cylinder and to the audible alarm.

13. A station indicating operating means, including a cylinder, a piston therein responsive to air pressure, a rack bar operated by the piston, a gear wheel operated by the rack bar, an operating shaft, an indicating tape actuating in the movement of such shaft, means whereby the gear wheel operates the shaft in movement of such gear wheel in one direction and does not affect the shaft in movement of the gear wheel in opposite direction, and a curtain tape operated by the movement of the gear wheel in both directions of the latter.

14. A station indicator including an indicating tape, a curtain tape, fluid pressure means for operating said tapes, an air distributor for controlling the fluid pressure means, track sections for positioning the air distributor, and means intermediate the fluid pressure means and tapes for operating the indicating tape in certain movements of the fluid pressure means and for operating the curtain tape in all movements of the fluid pressure means.

15. A station indicator having a marked indicating tape, a sign strip normally covering the display position of such indicating tape, and means operated by track instrumentalities to simultaneously shift the sign strip to expose the marked indicating tape and move the indicating tape to a new display position.

16. A station indicator having a marked indicating tape, a sign strip normally covering the display position of such indicating tape, means operated by track instrumentalities to simultaneously shift the sign strip to expose the marked indicating tape and move the indicating tape to a new display position, and means operated by succeeding instrumentalities to return the sign strip to a position to cover the display portion of the indicating tape.

17. A station indicator, comprising an indicating tape, means for advancing said tape in a step by step movement, a sign strip adapted to cover that portion of the indicating tape arranged for display, and mechanism operated through track instrumentalities to first advance the indicating tape for a new display position, move the sign strip to expose the indicating tape, and return the sign strip to cover the indicating tape.

18. A station indicator, comprising an indicating tape, means for advancing said tape in a step by step movement, a sign strip adapted to cover that portion of the indicating tape arranged for display, and mechanism operated through track instrumentalities to first advance the indicating tape for a new display position, move the sign strip to expose the indicating tape, and return the sign strip to cover the indicating tape, the movement of said mechanism to return the sign strip to cover the indicating tape being without effect on the indicating tape.

19. A station indicator comprising a plurality of spaced drums, an indicating tape terminally wound about the drums, means for operating the drums to feed the tape, a sign strip movable to and from a position to cover the display portion of the tape, a member adapted for reciprocation, and means for causing both movements in reciprocation of said member to be transmitted to the sign strip, said means being arranged to cause one of said movements only of said member to be transmitted to the drums.

20. A station indicator comprising a plurality of spaced drums, an indicating tape terminally wound about the drums, means for operating the drums to feed the tape, a sign strip movable to and from a position to cover the display portion of the tape, a member adapted for reciprocation, means for causing both movements in reciprocation of said member to be transmitted to the sign strip, said means being arranged to cause one of said movements only of said member to be transmitted to the drums, and means responsive to air pressure for controlling the reciprocation of said member.

21. A station indicator comprising a plurality of spaced drums, an indicating tape terminally wound about the drums, means for operating the drums to feed the tape, a sign strip movable to and from a position to cover the display portion of the tape, a member adapted for reciprocation, means for causing both movements in reciprocation of said member to be transmitted to the sign strip, said means being arranged to cause one of said movements only of said member to be transmitted to the drums, means responsive to air pressure for controlling the reciprocation of said member, and means governed by track instrumentalities for controlling the air pressure to said air responsive means.

22. A station indicator having a marked indicating tape, a curtain tape movable to cover the exposed portion of the indicating tape under predetermined operating conditions, and a sign section defining the exposed area of the indicating tape, said sign section being movable to permit exposure of different sections of the indicating tape.

23. A station indicator comprising a casing having a display opening, a marked indicating tape travelling across said opening, a sign strip movable in the opening to restrict a predetermined portion thereof for the display of the indicating tape, and a curtain tape movable alternately from a position to cover the exposed area of the indicating tape to a position in rear of the sign strip.

24. A station indicator comprising a casing having a display opening, a marked indicating tape travelling across said opening, a sign strip manually movable in the opening to restrict a predetermined portion thereof for the display of the indicating tape, and a curtain tape movable alternately from a position to cover the exposed area of the indicating tape to a position in rear of the sign strip.

In testimony whereof I affix my signature.

VICENTE PERALES GAMBOA.